United States Patent
Shibano (10) Patent No.: US 7,857,132 B2
(45) Date of Patent: Dec. 28, 2010

(54) PACKAGE OF GOODS ATTACHED WITH IMAGE FOR FORMING THREE-DIMENSION IMAGE

(75) Inventor: Kunio Shibano, Tokyo (JP)

(73) Assignee: Sapporo Breweries Limited, Tokyo (JP)

( * ) Notice: Subject to any disclaimer, the term of this patent is extended or adjusted under 35 U.S.C. 154(b) by 684 days.

(21) Appl. No.: 10/551,231

(22) PCT Filed: Mar. 17, 2004

(86) PCT No.: PCT/JP2004/003536

§ 371 (c)(1),
(2), (4) Date: Sep. 27, 2005

(87) PCT Pub. No.: WO2004/087525

PCT Pub. Date: Oct. 14, 2004

(65) Prior Publication Data

US 2006/0207908 A1    Sep. 21, 2006

(30) Foreign Application Priority Data

Mar. 28, 2003  (JP) ............................. 2003-092284

(51) Int. Cl.
- B65D 85/00 (2006.01)
- G09F 3/00 (2006.01)
- G03B 35/00 (2006.01)

(52) U.S. Cl. ....................... 206/459.5; 40/312; 396/326; 396/332

(58) Field of Classification Search ............... 206/459.5, 206/427, 434; 40/310, 312; 229/110; 396/322, 396/326, 332

See application file for complete search history.

(56) References Cited

U.S. PATENT DOCUMENTS

| | | | |
|---|---|---|---|
| 2,634,041 A | 4/1953 | Burnett | |
| 4,558,528 A | 12/1985 | Cunningham | |
| 4,648,548 A * | 3/1987 | Shin | 206/459.5 |
| 4,953,779 A * | 9/1990 | Densen | 206/459.5 |
| 6,431,359 B1 * | 8/2002 | Hollander | 206/459.5 |
| 6,948,616 B2 * | 9/2005 | Gillani | 206/459.5 |
| 2002/0066688 A1 * | 6/2002 | Autterson | 206/459.5 |

FOREIGN PATENT DOCUMENTS

| | | |
|---|---|---|
| EP | 0 860 372 A | 8/1998 |
| GB | 2 332 532 A | 6/1999 |
| JP | 05 040242 A | 2/1993 |
| JP | 7-232770 | 9/1995 |
| WO | WO 98/08578 | 3/1998 |
| WO | WO 00/78055 A1 | 12/2000 |

* cited by examiner

*Primary Examiner*—Luan K Bui
(74) *Attorney, Agent, or Firm*—Oblon, Spivak, McClelland, Maier & Neustadt, L.L.P.

(57) ABSTRACT

The present invention discloses a merchandise package capable of presenting a three-dimensional image. An image A is disposed on one surface 11a of two surfaces of a merchandise package 11 and an image B is disposed on the other surface 11c thereof so that a three-dimensional image is formed by the images A and B becoming a pair. When the images A and B are juxtaposed while being paired, the two images provide a three-dimensional image to an observer. With this, novel distinguishing ability is given to the merchandise package and a customer who purchases the merchandise can enjoy the three-dimensional image by juxtaposing the merchandise packages, and thus a novel function is given to the merchandise package.

1 Claim, 9 Drawing Sheets

FIG.1

(A) PARALLEL OBSERVATION METHOD
(FOCUS ON A POINT BEHIND THE PHOTOGRAPHS)

(B) CROSS OBSERVATION METHOD
(FOCUS ON A POINT BEFORE THE PHOTOGRAPHS BY A CROSS-EYED STATE)

FIG.11

PACKAGE OF GOODS ATTACHED WITH IMAGE FOR FORMING THREE-DIMENSION IMAGE

TECHNICAL FIELD

The present invention relates to a package which wraps or contains merchandise, and in particular, a merchandise package on which images from which a three-dimensional image can be observed are disposed on its outside surfaces.

BACKGROUND ART

When merchandise is sold, the merchandise is generally wrapped in a merchandise package of a box shape. This merchandise package is a box-shaped package which is formed by a material such as cardboard, and has a function of protecting the packaged merchandise and also a function of holding plural pieces of merchandise. Further, the merchandise package has a function of displaying the merchandise by printing a displaying image such as a proper pattern and a proper mark with respect to the merchandise to be packaged on the outside surface. Generally, this displaying image shows the form and the contents of the merchandise, or is an image by which the reputation of the merchandise is intended to improve or an image by which customers are attracted.

For example, in many cases, cans of beer, low-malt beer, a soft drink, etc., are sold in a merchandise package in which plural cans such as half a dozen cans and one dozen cans are contained. Such a merchandise package has a box shape being a hexahedron such as a rectangular parallelepiped and a cube, and various displaying images are disposed on the surfaces of the merchandise package except the bottom surface. In this case, an individual image is disposed on each of the surfaces or a common image is disposed thereon; however, for example, by considering how the merchandise package(s) is to be displayed, the surface to become the front surface is decided and an image showing the most attractive point of the merchandise is disposed on the front surface.

As mentioned above, in many cases, on the merchandise package, an image with respect to the merchandise and an image such as a pattern that improves the distinguishing ability from another company's merchandise are displayed. However, images being shown on the outside surfaces of the conventional merchandise package are decided by considering the displaying function of one merchandise package. In other words, by considering that the displaying function becomes the maximum as the merchandise package at the time when one merchandise package is observed, an image to be disposed on each of the surfaces of the merchandise package is decided. Therefore, the distinguishing ability and the displaying ability of the merchandise package are decided by the image itself disposed on each surface, and are restricted by the distinguishing ability and the displaying ability of the image itself disposed on each surface. Therefore, conventionally, there is a problem that an additional function cannot be added to the merchandise package.

DISCLOSURE OF THE INVENTION

Accordingly, it is a general object of the present invention to provide a merchandise package having a novel image displaying function by which an added value can be given in addition to a conventional image displaying function; in particular, to provide a merchandise package on which images for forming a three-dimensional image are disposed.

The above-mentioned problems can be solved by the means of the present invention.

According to an aspect of the present invention, there is provided a merchandise package, wherein images capable of forming a three-dimensional image by becoming a pair are provided and one of the images is disposed on one surface of at least two surfaces of the merchandise package and the other of the images is disposed on the other surface thereof.

According to this aspect, of the images becoming a pair, each has a function as a displaying image for the merchandise package, and also when the paired images are juxtaposed, the two images give a three-dimensional image to an observer. With this, novel distinguishing ability is given to the merchandise package, and also a novel function, by which a customer who purchases the merchandise can enjoy observing the three-dimensional image by juxtaposing the merchandise packages, can be added to the merchandise package.

According to another aspect of the present invention, the merchandise package is a regular parallelepiped, images capable of forming a three-dimensional image by becoming a pair are provided, and one of the images is disposed on the front surface of the merchandise package and the other of the images is disposed on the back surface thereof. According to this aspect, in a case where the merchandise package is a regular parallelepiped, by disposing the images for forming a three-dimensional image on the front surface and the back surface, respectively, when the merchandise packages are displayed, the displaying arrangement of the merchandise for causing customers to observe the three-dimensional image becomes easy.

According to another aspect of the present invention, a merchandise package includes a first package and a second package having the same structure that the first package has, wherein images capable of forming a three-dimensional image by becoming a pair are provided and one of the images is disposed on a predetermined surface of the first package and the other of the images is disposed on a predetermined surface of the second package. According to this aspect, a three-dimensional image is formed by using the two merchandise packages having the same structure. In the present invention, since it is not necessary that two images for forming a three-dimensional image be disposed on one merchandise package, the degree of freedom of cosmetic design for other surfaces increases.

According to another aspect of the present invention, a merchandise package is a hexahedron, wherein images capable of forming a three-dimensional image by becoming a pair are disposed on at least a pair of surfaces of the merchandise package. According to this aspect, different pairs of images for forming different three-dimensional images can be disposed on three groups of surfaces of the regular hexahedron, respectively.

According to another aspect of the present invention, a merchandise package has two outside surfaces, wherein images capable of forming a three-dimensional image by becoming a pair are provided and one of the images is disposed on a first outside surface and the other of the images is disposed on a second outside surface. According to this aspect, for example, a merchandise package of a spread type and a merchandise package of a bag type have two outside surfaces. Therefore, by disposing images for forming a three-dimensional image on these two surfaces, a merchandise package on which a three-dimensional image is observed can be obtained.

According to another aspect of the present invention, a merchandise package has at least one outside surface, wherein a figure having a point symmetry shape is disposed on the outside surface in a manner such that the center of the figure is displaced from the center point of the outside surface, and a three-dimensional image is observed when the two merchandise packages are juxtaposed in a manner such that one of the two merchandise packages is rotated by 180 degrees.

According to this aspect, by disposing only one image on the merchandise package and arranging the two merchandise packages in a manner such that the direction of one of the two merchandise packages is rotated, a three-dimensional image can be observed.

According to another aspect of the present invention, there is provided a photographing method for observing a three-dimensional image. In this method, the same two objects are faced toward a camera in a manner such that each of the two objects has a different angle from the camera and the two objects are photographed together in one photograph.

According to this aspect, by using the same kind of objects, a photograph capable of being observed as a three-dimensional image can be obtained by one photographing.

BRIEF DESCRIPTION OF THE DRAWINGS

FIGS. 3A and 3B are diagrams showing a merchandise package according to an embodiment of the present invention wherein

BEST MODE FOR CARRYING OUT THE INVENTION

In the following, embodiments of the present invention are shown so as to explain the present invention in more detail.

First, before explaining the embodiments of the present invention, the principle in forming a three-dimensional image is explained.

The eyes of a human being are positioned right and left at a distance of about 6 to 7 cm; therefore, images, whose angles are different, of an object such as scenery are perceived in respective eyes. The object is recognized three-dimensionally by the brain that processes these two different right and left images. A three-dimensional photograph (3D photograph) is a photograph in which this principle is applied; one object to be taken is photographed from two positions at the same time, the two taken images are observed separately by both eyes, and two plane photographs can be seen three-dimensionally. As the photographing method, there are a method using a stereo camera which has two lenses in an interval of about 7 cm being close to the interval of the naked eyes, a method in which two normal cameras are positioned in an interval of about 7 cm and an object is photographed by both cameras at the same time, and a method in which two photographs are taken by moving one camera in parallel and two photographs are taken for one object.

As methods observing a three-dimensional photograph, there are a parallel observation method in which two photographs are observed by making the right and left lines of sight almost parallel, and a cross observation method in which two photographs are observed by making the right and left lines of sight cross. The three-dimensional image can be observed by observing the two photographs in the use of one of the above-mentioned methods, and also can be more easily observed by using a specific instrument such as a viewer. In addition, a person can observe the three-dimensional image after some training without using the specific instrument such as the viewer.

Figure 1:
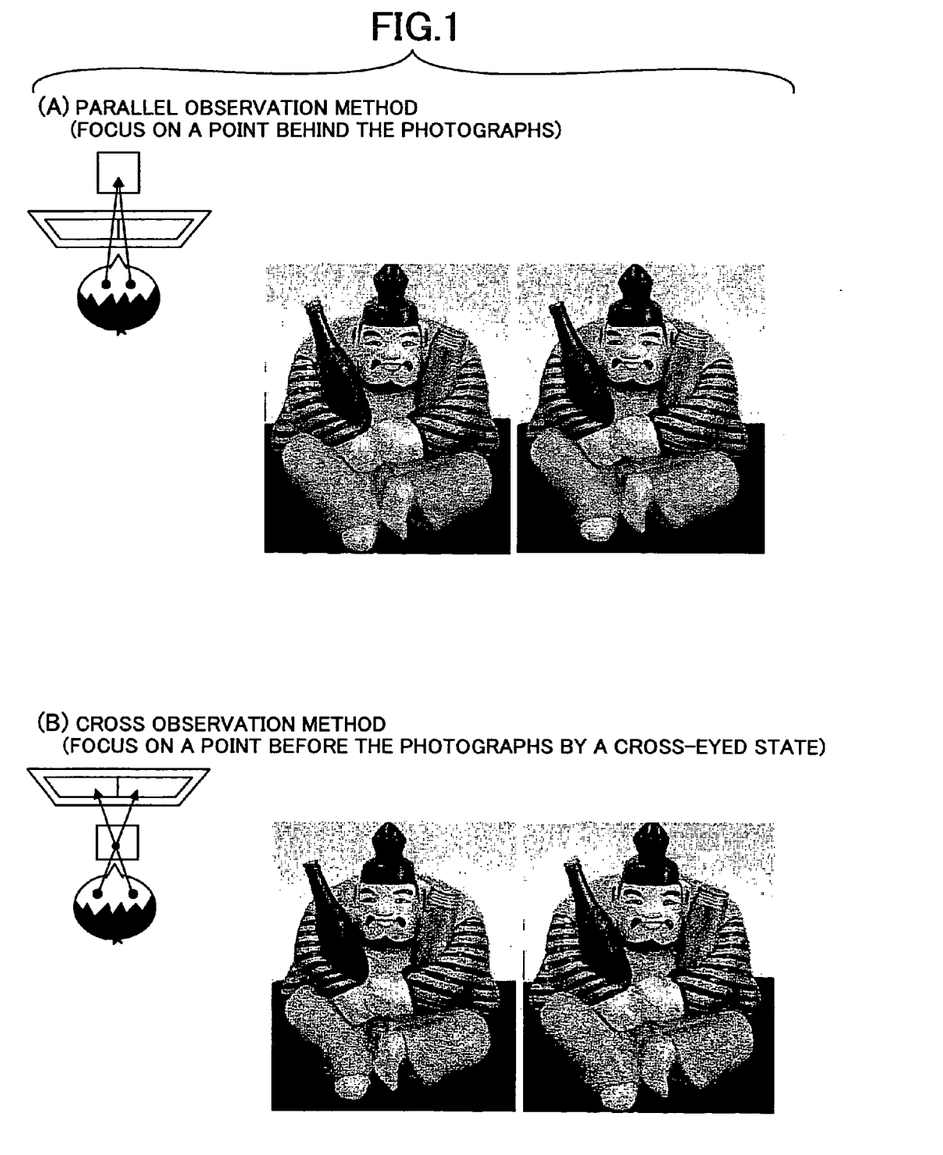
FIG. 1 is a diagram explaining methods of observing a three-dimensional photograph, wherein (A) shows a parallel observation method and (B) shows a cross observation method.

FIG. 1 is a diagram explaining methods of observing a three-dimensional photograph and shows the methods of observing two photographs taken by one of the above-mentioned methods, wherein (A) shows the parallel observation method and (B) shows the cross observation method. As shown in FIG. 1, a three-dimensional image can be observed by the parallel observation method or the cross observation method by juxtaposing the two photographs.

Next, embodiments of the present invention in which the above-mentioned three-dimensional image is applied to a merchandise package are explained.

Figure 2:
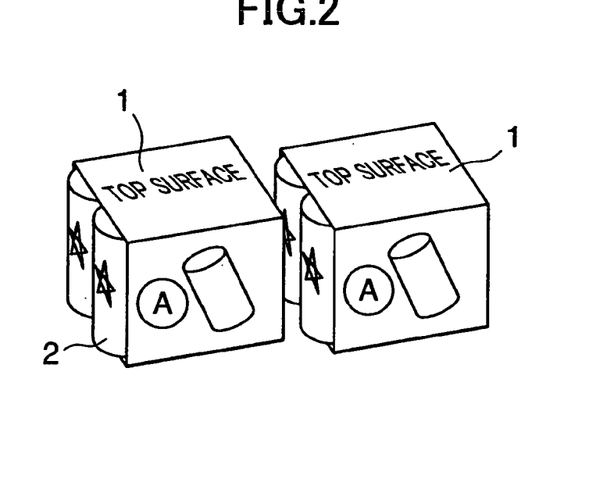
FIG. 2 is a diagram showing a form of a merchandise package.

FIG. 2 is a diagram explaining a merchandise package to which the present invention is applied, and in FIG. 2, a merchandise package 1 of a simple type which wraps plural beverage cans is shown. The merchandise package 1 is a box-shaped container having four surfaces which is formed by folding belt-shaped cardboard. One merchandise unit is formed so that the plural beverage cans are wrapped in a state that some parts of the surfaces of some beverage cans are exposed at both sides of the merchandise package. Generally, at a state in which the merchandise units are positioned as shown in FIG. 2, a main image of the merchandise to be wrapped is disposed on an A surface at the front side, and in this example, an image showing an appearance of the merchandise is printed. In this, if necessary, a suitable pattern, a suitable expression, etc., are also disposed on the top surface and the back surface.

Figure 3A:
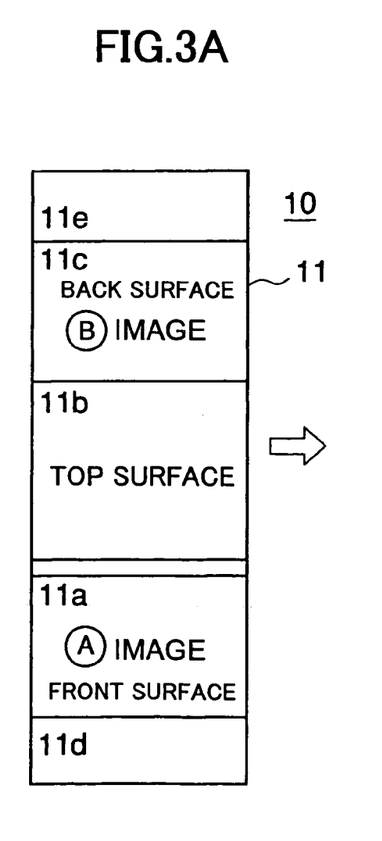
FIG. 3A shows cardboard before forming the merchandise package.
Figure 3B:
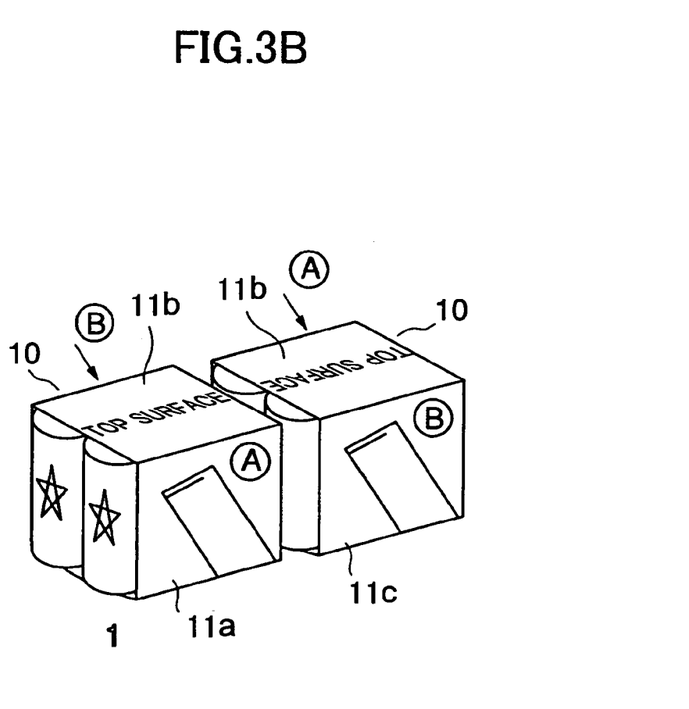
FIG. 3B shows the merchandise package which is formed by the cardboard.

FIGS. 3A and 3B are diagrams showing a merchandise package 10 according to an embodiment of the present invention and show an example in which the present invention is applied to the merchandise package of the simple type shown in FIG. 2. In FIG. 3A, cardboard 11 before forming the merchandise package 10 is shown. In FIG. 3B, the merchandise package 10 which is formed by the cardboard 11 is shown.

The cardboard 11 has five portions 11a, 11b, 11c, 11d, and 11e so as to form four surfaces. These five portions correspond to the front surface 11a, the top surface 11b, the back surface 11c, and the bottom surfaces 11d and 11e. Here, in the present embodiment, there is the following specific relation between an image A which is printed on the front surface 11a and an image B which is printed on the back surface 11c. In this, an image to be printed is not limited to a photograph, and a figure, a pattern, etc., formed by a suitable method such as a computer graphics method are included in the image.

In the present embodiment, the image A which is printed on the front surface 11a and the image B which is printed on the back surface 11c are images having a relation to form a three-dimensional image. At the example shown in FIG. 3B, cans are shown, and the image A and the image B of the can are able to be obtained, for example, by taking photographs of the can being the object twice by the above-mentioned method in which one camera is moved in parallel. Consequently, on the front surface and the back surface of one merchandise package, the image A and the image B, being different from each other in which a small difference that cannot be distinguished by observers in general exists, are respectively printed.

When the cardboard 11 on which the image A and the image B are printed at the positions corresponding to the front surface and the back surface shown in FIG. 3A is folded, the merchandise package 10 shown in FIG. 3B is formed. When the two merchandise packages 10 which have the image A on the front surface and the image B on the back surface are juxtaposed as shown in FIG. 3B, a pair of images for forming a three-dimensional image explained in FIG. 1 is disposed. Therefore, for example, when the merchandise packages 10 of the present embodiment are positioned at a display stand in a shop, a function by which a three-dimensional image is observed can be obtained by the merchandise packages, and the merchandise package can have a novel function in addition to the conventional function. In addition, a purchaser of the merchandise having this merchandise package can enjoy observing the three-dimensional image at the time when purchasing the merchandise, and the promotional effect for the merchandise having this merchandise package can be increased extremely.

Since the merchandise package 10 of the present embodiment has images, by which a three-dimensional image can be observed, on the front surface and the back surface of one package, it is enough that the cardboard on which the images are printed is one piece. And only by placing the two merchandise packages 10 in a manner so that the front surface and the back surface are juxtaposed as shown in FIG. 3B, the three-dimensional image can be enjoyed.

Figure 4:
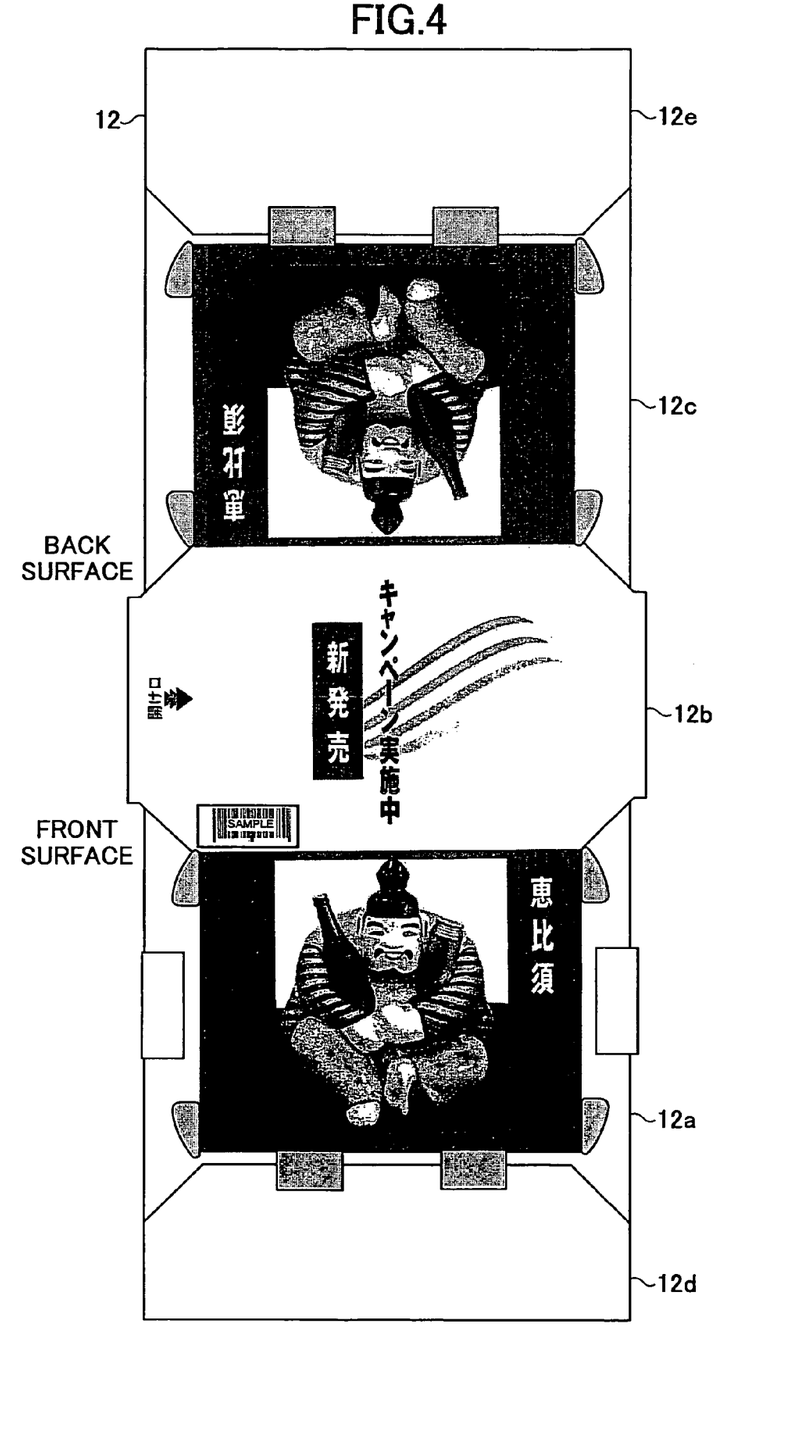
FIG. 4 is a diagram showing an actual example of an image A and an image B of the merchandise package shown in FIGS. 3A and 3B.

FIG. 4 shows cardboard 12 on which an actual example of an image A and an image B of the merchandise package shown in FIGS. 3A and 3B is provided. The photographs shown in FIG. 1 are utilized for a portion 12a being the front surface and a portion 12c being the back surface.

Figure 5:
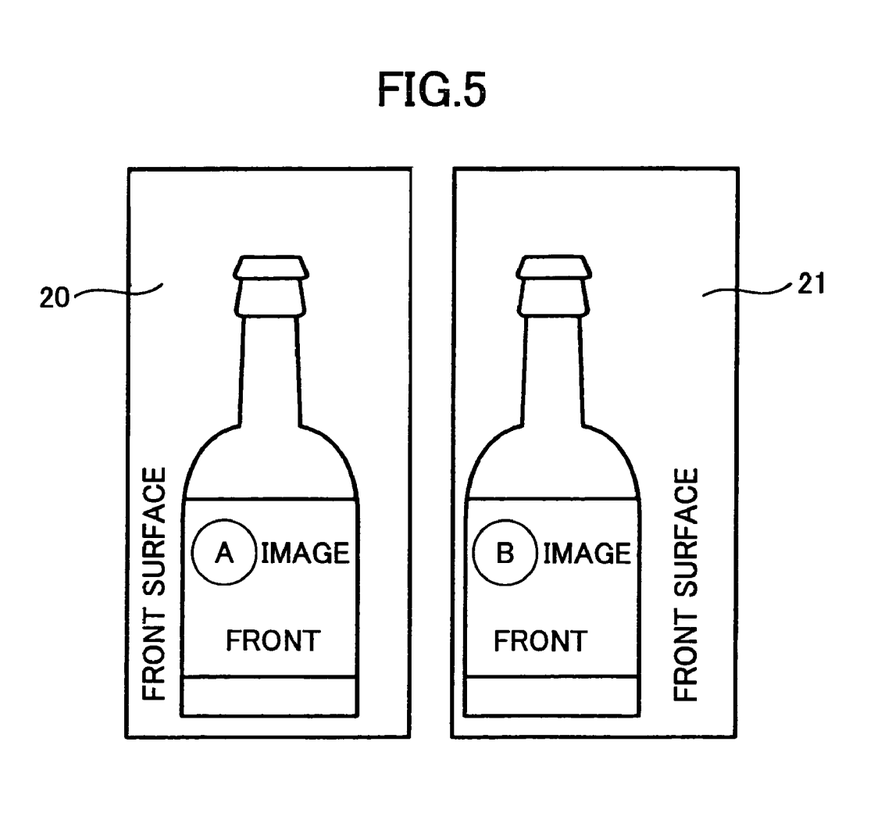
FIG. 5 is a diagram showing another embodiment of the present invention.

FIG. 5 shows another embodiment of the present invention. In the embodiment shown in FIGS. 3A, 3B, and 4, the images for forming a three-dimensional image are disposed on the front surface and the back surface of one merchandise package. However, in the embodiment shown in FIG. 5, an example, in which a three-dimensional image can be observed from images printed on two merchandise packages, is shown.

The merchandise package of the present embodiment consists of a pair of merchandise packages 20 and 21 having the same structure in which one image for forming a three-dimensional image is disposed on a predetermined surface of the merchandise package 20 and the other image for forming the three-dimensional image is disposed on a predetermined surface of the merchandise package 21.

That is, an image A is printed on the front surface of the merchandise package 20, and an image B is printed on the front surface of the other merchandise package 21 which pairs up with the merchandise package 20. In this embodiment, images showing a beverage bottle being merchandise to be contained are printed, and the image A and the image B, as shown in the above-mentioned embodiment, are taken so that a three-dimensional image can be observed when they are juxtaposed.

As mentioned above, by disposing each of different images for forming a three-dimensional image on the corresponding surface of a container having the same structure, when these merchandise packages are displayed in a shop in a juxtaposed position, an effect forming a three-dimensional image like the above-mentioned embodiment is created, and the function of the merchandise package can be increased. In addition, a customer who purchases this can enjoy the three-dimensional image from the merchandise packages.

Figure 6A:
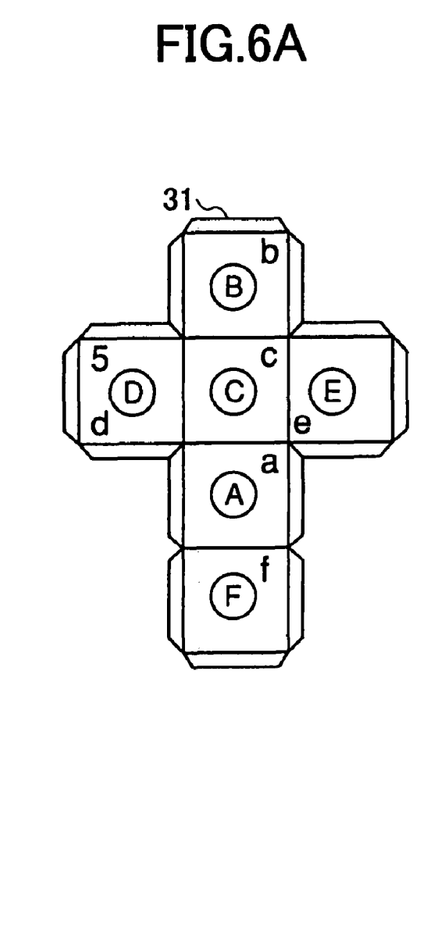
FIGS. 6A, 6B, and 6C are diagrams showing another embodiment of the present invention.
Figure 6B:
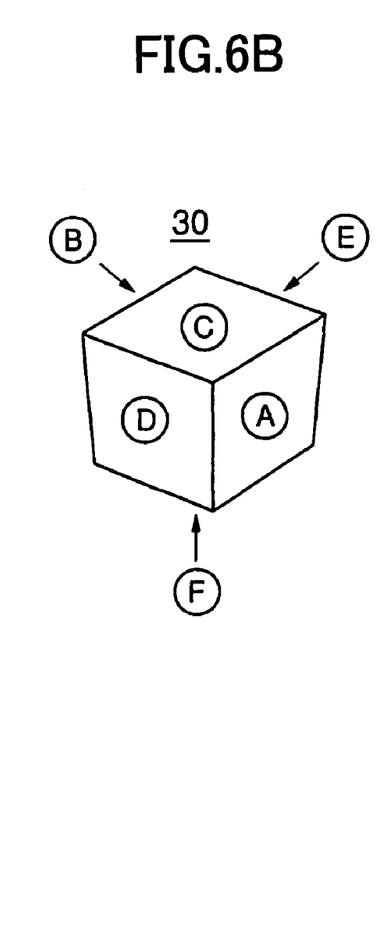
Figure 6C:
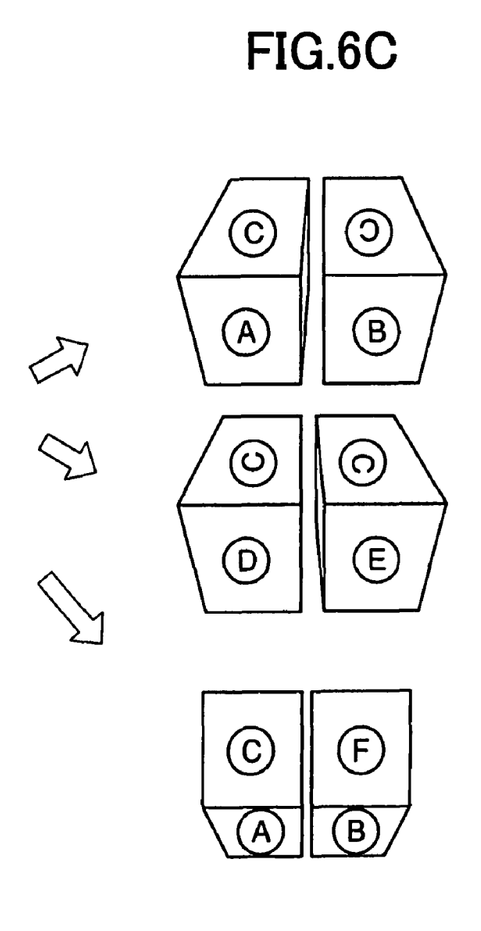

FIGS. 6A, 6B, and 6C show a merchandise package 30 according to another embodiment of the present invention. The merchandise package 30 according to the present embodiment is a regular hexahedron, and has the front surface "a", the back surface "b", the top surface "c", the left and right side surfaces "d" and "e", and the bottom surface "f", as shown in cardboard 31 of FIG. 6A. These six surfaces are made to be three pairs of surfaces, and images are printed on the surfaces so that each pair can form a three-dimensional image. In the example shown in FIG. 6A, the front surface "a" pairs up with the back surface "b", and an image A is disposed on the front surface "a" and an image B is disposed on the back surface "b"; the top surface "c" pairs up with the bottom surface "f", and an image C is disposed on the top surface "c" and an image F is disposed on the bottom surface "f"; and the left side surface "d" pairs up with the right side surface "e", and an image D is disposed on the left side surface "d" and an image E is disposed on the right side surface "e". As explained in FIGS. 1 and 5, the image A pairs up with the image B, the image C pairs up with the image F, the image D pairs up with the image E, and three-dimensional images are formed, respectively. Therefore, according to the merchandise package 30 that is a regular hexahedron, as shown in FIG. 6C, when two merchandise packages 30 are juxtaposed so that the above-mentioned pairs can be formed, it becomes possible that three kinds of three-dimensional images are formed, and customers can enjoy observing them.

Figure 7A:
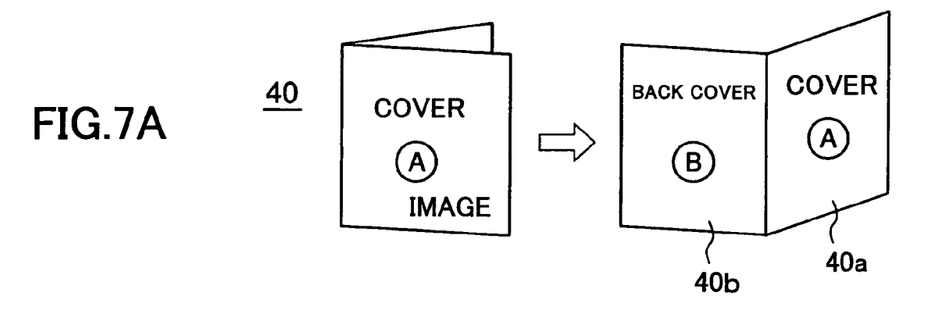
FIG. 7A is a diagram showing another embodiment of the present invention.

FIG. 7A shows another embodiment of a merchandise package according to the present invention. A merchandise package 40 shown in FIG. 7A is a so-called book type package that can spread and provides outside surfaces of a cover 40a and a back cover 40b, and is a merchandise package that holds content by sandwiching it between the cover 40a and the back cover 40b.

In the present embodiment, a pair of images for forming a three-dimensional image is disposed on the cover 40a and the back cover 40b. That is, an image A is disposed on the cover 40a and an image B is disposed on the back cover 40b. The image A and the image B are images having a relation by which a three-dimensional image is formed based on the principle shown in FIG. 1. According to the merchandise package 40 of the present embodiment, by juxtaposing the two merchandise packages in a manner so that both of the cover and the back cover face the same direction, a three-dimensional image can be enjoyed like the above-mentioned embodiments.

Figure 7B:
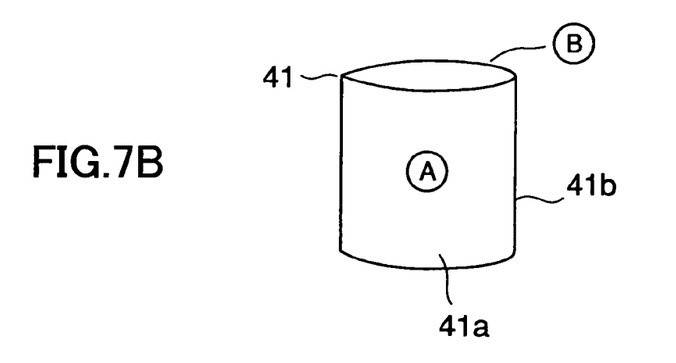
FIG. 7B is a diagram showing another embodiment of the present invention.

In addition, a merchandise package 41 shown in FIG. 7B is a bag-shaped package, and an image A and an image B for forming a three-dimensional image can be disposed on two surfaces being the front surface and the back surface.

In the above-mentioned embodiments, different images which form a three-dimensional image by becoming a pair are disposed on each of the merchandise packages. That is, in the embodiment shown in FIGS. 3A and 3B, on the front surface 11a and the back surface 11c, different images A and B for forming a three-dimensional image are disposed.

Also, the embodiment shown in FIG. 5 is an example in which different images A and B that form a three-dimensional image by becoming a pair are disposed on different front surfaces.

In the following, embodiments which can form a three-dimensional image where one kind of image becomes a pair is explained.

Figure 8:
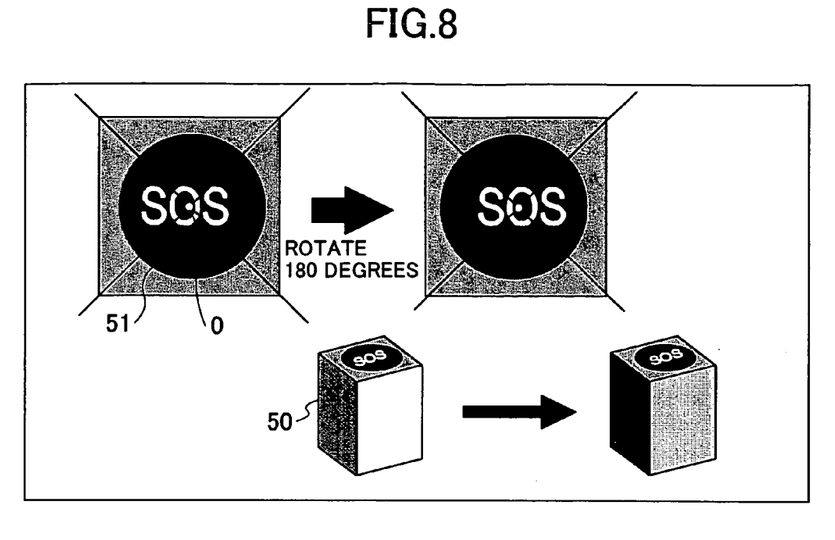
FIG. 8 is a diagram showing another embodiment of the present invention.

FIG. 8 is a diagram showing a merchandise package 50 on whose top surface having a regular square a displaying FIG. 51, in which letters SOS are disposed in a circle figure, is disposed. This displaying FIG. 51 is slightly displaced from a point symmetry figure which has the intersection point O of the diagonal lines of the regular square as its center. That is, when the figure is rotated by 180 degrees as shown in FIG. 8, figures before and after the rotation are almost the same figures, but are slightly displaced from each other relative to the reference being the center point O (intersection point).

Figure 9A:
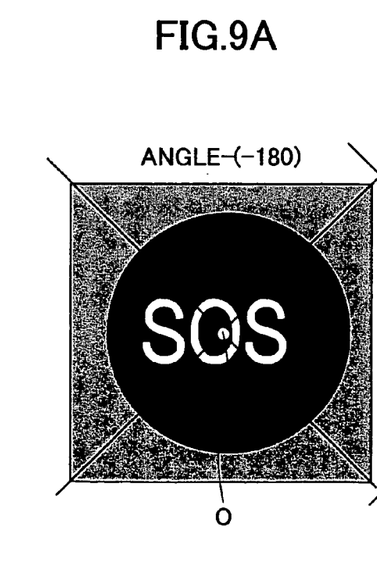
FIGS. 9A and 9B are drawings in which a part of FIG. 8 is enlarged.
Figure 9B:
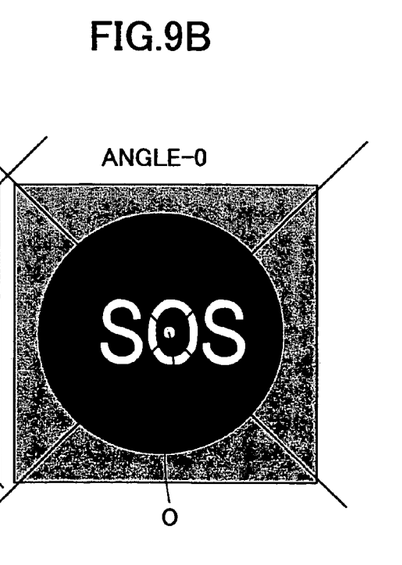

FIGS. 9A and 9B are figures in which the regular square part shown in FIG. 8 is enlarged, wherein FIG. 9A shows a state where the figure is at the reference position and FIG. 9B shows a state where the figure is rotated by 180 degrees. When the figure composed of the circle and the letters SOS is observed before and after the rotation, at the state shown in FIG. 9A before the rotation, the circle is slightly displaced relative to the regular square on the top surface in the right direction and the letters SOS are displaced relative to the circle in the left direction. In addition, at the state shown in FIG. 9B after the top surface is rotated by 180 degrees, the circle is slightly displaced relative to the regular square on the top surface in the left direction and the letters SOS are displaced relative to the circle in the right direction. When the two merchandise packages 50 having this figure are prepared and are juxtaposed in a manner so that one of them is rotated by 180 degrees relative to the other, two figures whose states are slightly displaced can be observed; by this, a three-dimensional image can be observed like the above-mentioned embodiments.

In this, in the present embodiment, figures or patterns by which some degree of displacement in a vision difference can occur in the right and left eyes must be included at the time when the merchandise packages are juxtaposed in a manner so that one of them is rotated by 180 degrees. That is, figures or patterns, by which a three-dimensional image can be formed, where the figures or the patterns become a pair and which approximately achieve point symmetry at the time when one of the figures or the patterns is rotated by 180 degrees, must be included in the merchandise package.

According to the merchandise package in the present embodiment, by only disposing a single FIGURE or a single pattern on a predetermined surface of a merchandise package, when two merchandise packages are juxtaposed by changing their directions, a three-dimensional image can be enjoyed.

As it is understandable from the above-mentioned explanation, in the present embodiment, in a case where a figure or a pattern for forming a three-dimensional image is disposed, a figure or a pattern achieving point symmetry is used, and the figure or the pattern is disposed on a predetermined surface of the merchandise package in a manner so that the center of the figure or the pattern is displaced slightly. With this, the present embodiment can be achieved.

Figure 10A:
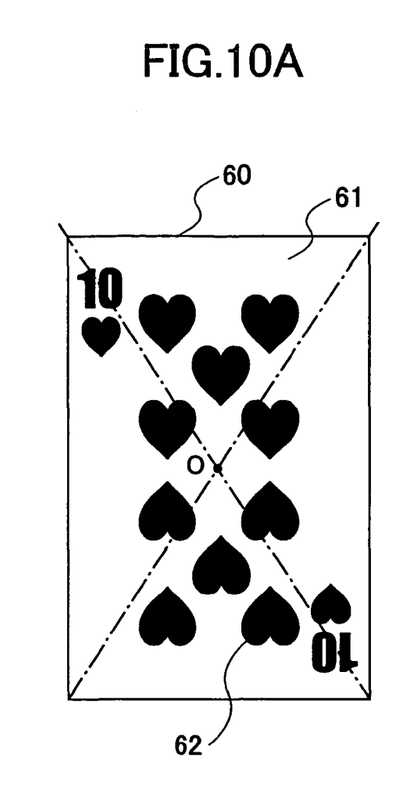
FIGS. 10A and 10B are diagrams showing another embodiment of the present invention.
Figure 10B:
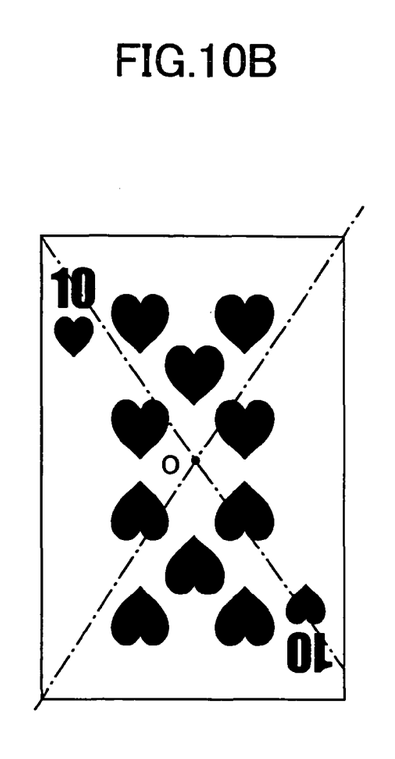

FIGS. 10A and 10B are diagrams showing another embodiment of point symmetry figures, and in this embodiment, an example, in which a pattern 62 of the ten of hearts in cards is disposed on a surface 61 of a merchandise package 60, is shown. The pattern 62 is point symmetry and is disposed on the surface 61 by being slightly displaced from the center point O of the surface 61. With this, by rotating one of the surfaces, on which the same pattern is disposed, by 180 degrees, a three-dimensional image can be observed.

As explained above, images for forming a three-dimensional image are obtained by taking two photographs of an object from different angles by using a camera, this photographing method has been conventionally used. In this method, one object is photographed twice by one camera; however, the inventor of the present invention found out a method, in which photographs for forming a three-dimensional image for printing on a merchandise package are obtained by one photographing.

Figure 11:
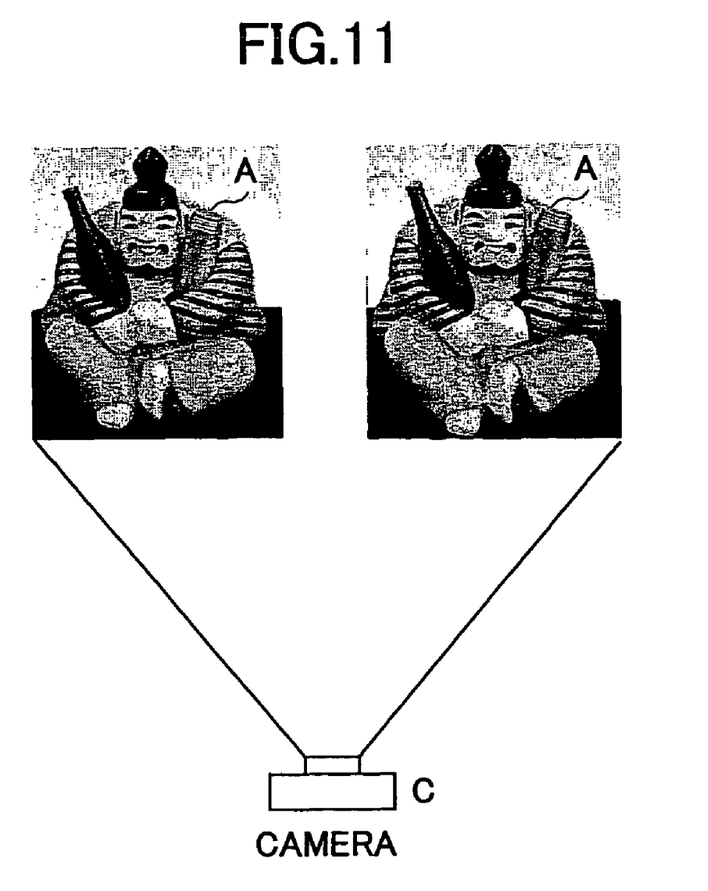
FIG. 11 is a diagram explaining a method in which photographs for a three-dimensional image are taken by one photographing.

FIG. 11 is a diagram explaining a method in which photographs for a three-dimensional image are taken by one photographing. In the present method, as the object to be taken, the same objects A and A are prepared. And as shown in FIG. 11, the objects A and A are juxtaposed and a camera C is positioned in front of the objects. In this, the position of the camera C is arbitrary, and it is enough that both of the objects are in the visual field of a finder (displaying screen). Further, by setting the directions of the objects A and A for the camera C individually, the two objects A and A are juxtaposed at different angles for the camera C by facing the camera C. By photographing in this state, one photograph similar to, for example, the photograph shown in FIG. 1, in which two photographs are disposed adjacently by photographing one object in the two different angles, can be obtained.

In the case of the merchandise packages of the embodiments shown in FIGS. 7A and 7B, the image A and the image B becoming a pair are disposed adjacently on a piece of printing paper. Therefore, when such images for forming a three-dimensional photograph are obtained by photographing, the images can be easily obtained by adopting the method of the present invention shown in FIG. 11.

In the above-mentioned description, the preferred embodiments of the present invention are explained in detail. However, the present invention is not limited to the above-explained particular embodiments, but various variations and modifications may be made without departing from the scope of the present invention. In the above, the embodiments in which images for observing a three-dimensional image are obtained by taking photographs are explained; however, a pair of images can be formed by using, for example, computer graphics technology, instead of taking photographs. Further, the image is not limited to an image related to merchandise; all kinds of images such as a pattern and an abstract painting can be used for the three-dimensional image.

As is clear from the above detailed description, in the merchandise package according to the present invention, images for forming a three-dimensional image are disposed on the side surfaces of the merchandise package; therefore, customers can enjoy observing the three-dimensional image, and the function of the merchandise package can be made higher.

The invention claimed is:

1. A set of merchandise packages, comprising:
a first package having at least one outside surface, wherein a figure having a point symmetry shape is disposed on the outside surface in a manner such that a center of the figure is displaced from a center point of the outside surface, and
a second package identical to the first package,
wherein a three-dimensional image is observed from an upright view of the figure of the first package and an upside-down view of the figure of the second package when the first and second merchandise packages are juxtaposed in a manner such that one of the first and second merchandise packages is rotated by 180 degrees upside down.

* * * * *